United States Patent [19]
Pierson et al.

[11] 3,985,941
[45] Oct. 12, 1976

[54] METHOD OF POLYMERIZATION
[75] Inventors: Robert M. Pierson, Hudson; Leonard J. Kuzma, Copley, both of Ohio
[73] Assignee: The Goodyear Tire & Rubber Company, Akron, Ohio
[22] Filed: May 12, 1975
[21] Appl. No.: 576,769

[52] U.S. Cl. ............................ 526/133; 252/429 B; 526/137; 526/335
[51] Int. Cl.² ..................... C08F 4/12; C08F 36/06
[58] Field of Search ............... 260/94.3; 252/429 B, 252/431 R, 431 C, 431 N; 526/133, 137

[56] References Cited
UNITED STATES PATENTS 3,170,905  2/1965  Ueda et al. .................. 260/94.3
3,170,907  2/1965  Ueda et al. .................. 260/94.3
3,856,764  12/1974  Throckmorton et al. ......... 260/94.3

*Primary Examiner*—Edward J. Smith
*Attorney, Agent, or Firm*—F. W. Brunner; J. Y. Clowney

[57] ABSTRACT

A method of polymerization of butadiene to form polymers with a high (greater than 90 percent) content of cis-1,4 configuration wherein a mixed fluoride bearing catalyst system is utilized to control the polymerization rate and the molecular weight.

8 Claims, 2 Drawing Figures

METHOD OF POLYMERIZATION

This invention is directed to a method of polymerization of butadiene to form polymers with a high (i.e. >90 percent) content of cis-1,4 configuration. It is also directed to the preparation of and to the improved catalyst systems useful for this purpose. More specifically, the invention relates to an improved catalyst for producing cis-1,4-polybutadiene with a modified molecular weight.

There are prior art methods for the preparation and use of fluoride-bearing compounds with nickel compounds and aluminum compounds as catalysts. In these prior art methods it is desired to form a polymer having a stereoregular configuration and a high molecular weight. The polymers produced by these catalyst systems are useful in the rubber industry.

Boron trifluoride ($BF_3$) ternary catalyst systems comprising an organoaluminum compound, an organonickel compound and a boron trifluoride complex compound are known to produce a stereoregular polymer. Similar catalysts utilizing a hydrogen fluoride (HF) complex compound substituted for the boron trifluoride complex compound are also known to produce stereoregular polymers.

In these prior art catalyst systems, the boron trifluoride.diethyl ether complex appears to be quite limited with respect to the selection of the trialkylaluminum component if optimum reaction rates for this system are to be attained. To maintain the optimum reaction rate with this catalyst system, the choice of trialkylaluminum compound appears to be limited to triethylaluminum. When the ethyl group in the trialkylaluminum compound is replaced with longer chain alkyl groups, for example, n-propyl or isobutyl, not only is the polymerization reaction rate of this system appreciably reduced, but the molecular weight of the resulting polymer decreases below desirable values. The decline in reaction rate and polymer properties is particularly sharp when the triethylaluminum is replaced with diisobutyl aluminum hydride, triisobutylaluminum and/or organoaluminum compounds containing even longer chain alkyl group than the butyl group. The dilute solution viscosity (DSV) using a boron trifluoride diethyl ether complex in conjunction with an organoaluminum compound such as triisobutylaluminum is in the range of 2 or lower, where DSV is a measure of the molecular weight.

The polymers produced by the boron trifluoride catalyst system have been used to produce what is known in the industry as a more processable polymer. Many patents have been issued in which the "more processability" argument has been utilized. The processability contention is usually based on a lower molecular weight polymer.

The ternary catalyst system which utilizes the HF complex in place of the $BF_3$ complex compound has certain advantages and disadvantages. The HF complex catalyst produces a high molecular weight compound, usually having a DSV of around 5 and at the same time giving very rapid rates of polymerization. One disadvantage of the HF catalyzed system is that the fluoride/aluminum ratio has to be strictly monitored. That is, if the fluoride/aluminum ratio exceeds 3/1, the rate of polymerization falls off drastically. The HF complex catalyst produces a polymer which can be oil extended.

It is an object of the present invention to make a stereoregular polymer having a molecular weight suitable for plastics grade usage, that is, to be used as the impact-imparting component of impact grades of polystyrene. A polymer with these characteristics should have a molecular weight higher than that polymer produced by boron trifluoride complex ($BF_3$) mentioned above using triisobutylaluminum, yet having a molecular weight lower than that produced by the HF catalyst mentioned above. Another object is to produce this polymer with a fairly rapid rate of polymerization since it is economically unfeasable to have a very long polymerization time.

It might seem obvious in order to produce a polymer having a molecular weight (DSV) between the HF complex system and the $BF_3$ complex system to simply mix the two systems in order to get an intermediate polymer property. However, this cannot be so readily accomplished since once the fluoride/organoaluminum ratio in an HF complex type catalyst exceeds 3/1, then the desired rapid rate of polymerization is no longer attainable.

Also, the problem associated with longer chain alkyl groups on organoaluminum compounds used in conjunction with the boron trifluoride catalyst has to be kept in mind. For once the alkyl group reaches the size of a butyl group the polymerization and molecular weight decrease.

It has unexpectedly been discovered that a $BF_3$ complex catalyst and an HF complex catalyst can be used together in a catalyst system to yield a controlled molecular weight (DSV) but at the same time giving a rate of polymerization that is much greater than either the $BF_3$ complex catalyst or the HF complex catalyst could produce along at the same fluoride/aluminum ratio. That is, at fluoride/aluminum ratios described by the present invention the HF complex system would give low conversion of monomer to polymer. At the same time, however, the $BF_3$ complex catalyst system would give a detactable rate of polymerization but it would be very slow. The unexpectedness of the instant invention then, is that a high rate of polymerization is maintained at fluoride/aluminum ratios that one could not obtain from either system alone.

It has also been discovered that by utilizing a triisobutyl aluminum compound with a mixed fluoride bearing compound, that here we have a mixed catalyst system that contains an alkyl group which had certain disadvantages as taught by the prior art but yet in the hands of the inventor produces a polymerization rate and polymer properties that have heretofore not been taught.

Accordingly, then, the total fluoride/aluminum ratio which is described by the present invention along with the polymer characteristics as well as the rate of polymerization of the instant invention have heretofore not been described by the prior art.

According to the invention, then, butadiene is polymerized under solution polymerization conditions to form polybutadiene having a high proportion of butadiene units in the cis-1,4 configuration comprising contacting contacting butadiene with a catalyst consisting essentially of (1) triisobutyl aluminum, (2) an organonickel compound, and (3) a fluorinated mixture wherein the improvement comprises utilizing a mixture of hydrogen fluoride etherate (HF.Eth) and boron trifluoride etherate ($BF_3$.Eth) where the molar ratio of fluoride to aluminum (F/Al) (total fluoride from BF$_3$.Eth and HF.Eth) ranges upward from 3.0/1 to 20/1 when the mole percent of HF with respect to the total fluoride ranges from about 5 percent to 50 percent and when the mole percent of HF with respect to the total fluoride ranges from 50.1 percent to 95 percent, then for every one percent increase of HF in said hydrogen fluoride etherate and boron trifluoride etherate mixture, the F/Al molar ratio, starting at 20/1, has to decrease by 0.377, thereby producing a polybutadiene having a dilute solution viscosity (DSV) between 1.5 and 3.75 and the rate of butadiene conversion to polybutadiene is at least 50 percent per hour.

A more preferred F/Al ratio is from about 4/1 to about 10/1.

The organoaluminum compound which can be utilized within the practice of this invention to produce the kind of properties and polymerization rates desired is triisobutyl aluminum and tri-n-butyl aluminum.

Other organoaluminum compounds which may be utilized in this invention respond to the formula:

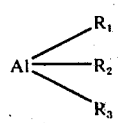

in which $R_1$ is selected from the group consisting of alkyl (including cycloalkyl), aryl, alkaryl, arylalkyl, alkoxy, hydrogen and fluorine, $R_2$ and $R_3$ being selected from the group of alkyl (including cycloalkyl), aryl, alkaryl, and arylalkyl. Representative of the compounds responding to the formula set forth above are: diethyl aluminum fluoride, di-n-propyl aluminum fluoride, di-n-butyl aluminum fluoride, diisobutyl aluminum fluoride, dihexyl aluminum fluoride, dioctyl aluminum fluoride, and diphenyl aluminum fluoride. Also included are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride and other organoaluminum hydrides. Also included are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. Also included are diethylaluminum ethoxide, diisobutylaluminum ethoxide and dipropylaluminum methoxide.

The component of the catalyst of this invention which contains nickel may be any organonickel compound. It is preferred to employ a soluble compound of nickel. These soluble nickel compounds are normally compounds of nickel with a mono- or bi-dentate organic ligand containing up to 20 carbon atoms. "Ligand" is defined as an ion or molecule bound to and considered bonded to a metal atom or ion. Mono-dentate means having one position through which covalent or coordinate bonds with the metal may be formed; bi-dentate means having two positions through which covalent or coordinate bonds with the metal may be formed. By the term "soluble" is meant soluble in inert solvents. Thus, any salt or an organic acid containing from about 1 to 20 carbon atoms may be employed. Representative of organonickel compounds are nickel benzoate, nickel acetate, nickel naphthenate, nickel octanoate, bis ($\alpha$-furyl dioxime) nickel, nickel palmitate, nickel stearate, nickel acetylacetonate, nickel salicaldehyde, bis (salicylaldehyde) ethylene diimine nickel, bis(cyclopentadiene) nickel, cyclopentadienyl-nickel nitrosyl and nickel tetracarbonyl. The preferred component containing nickel is a nickel salt of a carboxylic acid or an organic complex compound of nickel.

The component of the catalyst of this invention which contains the hydrogen fluoride and boron trifluoride complexes should be compounds which readily associate themselves with hydrogen fluoride and boron trifluoride.

The compounds which associate with the hydrogen fluoride and boron trifluoride to form this component of the catalyst, are the type that are capable of associating with hydrogen fluoride and boron trifluoride because of their electron donating character. Such compounds of association contain an atom or radical which is capable of landing electrons to or sharing electrons with hydrogen fluoride and boron trifluoride. Compounds capable of associating are ethers, alcohols, ketones, esters and nitriles.

The ketone subclass can be defined by the formula

where R' and R represent alkyl, cycloalkyl, aryl, alkaryl and arylalkyl radicals containing from 1 to about 30 carbon atoms; R' and R may be the same or dissimilar. These ketones represent a class of compounds which have a carbon atom attached by a double bond to oxygen. Representative but not exhaustive of the ketones useful in the preparation of the ketone-fluoride complexes of this invention are dimethyl ketone, methyl ethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone and the like. The preferred ketones to form the ketone-fluoride complexes of this invention are the dialkyl ketones of which acetone is most preferred.

The nitrile subclass can be represented by the formula RCN where R represents an alkyl, cycloalkyl, aryl, alkaryl and arylalkyl and contain up to about 30 carbon atoms. The nitriles contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. The preferred fluoridenitrile complexes prepared from the nitriles are benzonitrile complexes.

The alcohol subclass can be defined by the formula ROH where R represents alkyl, cycloalkyl, aryl, alkaryl, and arylalkyl radicals containing from about 1 to about 30 carbon atoms. These alcohols represent a class of compounds which have a carbon atom attached by a single bond to oxygen which is in turn attached to a hydrogen by a single bond. Representative but not exhaustive of the alcohols useful in the preparation of the fluoride complexes are methanol, ethanol, n-propanol, i-propanol, phenol, benzyl alcohol, cyclohexanol, butanol, hexanol and pentanol. The preferred fluoride-alcohol complexes are fluoride phenolate complexes.

The ether subclass can be defined by the formula R'OR where R and R' represent alkyl, cycloalkyl, aryl, alkaryl, and arylalkyl radicals containing from about 1 to about 30 carbon atoms; R and R' may be the same or dissimilar. The R's may also be joined through a common carbon bond to form a cyclic ether with the ether oxygen being an integral part of the cyclic structure such as tetrahydrofuran, furan or dioxane. These ethers represent a class of compounds which have two carbon atoms attached by single bonds to an oxygen atom. Representative but not exhaustive of the ethers useful in the preparation of the fluoride complexes of this invention are dimethyl, diethyl, dibutyl, diamyl, diisopropyl ethers, or tetrahydrofuran, anisole, diphenyl ether, ethyl methyl ether, dibenzyl ether and the like. The preferred fluoride-ether complexes formed from the ethers are the fluoride diethyl etherate and fluoride dibutyl etherate complexes.

The ester subclass can be defined by the formula:

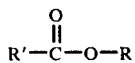

wherein R and R' are represented by alkyl, cycloalkyl, aryl, alkaryl and arylalkyl radicals containing from 1 to about 20 carbon atoms. The esters contain a carbon atom attached by a double bond to an oxygen atom as indicated. Representative but not exhaustive of the esters are ethyl benzoate, amyl benzoate, phenyl acetate, phenyl benzoate and other esters conforming to the formula above. The preferred fluoride ester complexes are the fluoride ethyl benzoate complexes.

The complexes of this invention are usually prepared by simply dissolving appropriate amounts of the complexing agent, for instance, a ketone, an ether, an ester, an alcohol or a nitrile in a suitable solvent and an appropriate amount of the fluoride in a suitable solvent and mixing the two solvent systems. This mixing should be done in the absence of water vapor. Another possible method would be to dissolve either the fluoride or the complexing agent in a suitable solvent and adding the other component. Still another method of mixing would be to dissolve the complexing agent in a solvent and simply bubble the gaseous fluoride through the system until all of the complexing agent is reacted with the fluoride. The concentrations may be determined by weight gain or chemical titration.

The four catalyst components interreact to form the active catalyst. As a result, the optimum concentration for any one component is very dependent upon the concentration of each of the other catalyst components. Furthermore, while polymerization will occur over a wide range of catalyst concentrations, polymers having the most desirable properties are obtained over a narrower range. Polymerization can occur wherein the mole ratio of the organoaluminum compound (Al) to the organonickel compound (Ni) ranges from about 10/1 to about 60/1; the mole ratio of the total fluoride content (F) to the organoaluminum compound (Al) ranges from about 3.0/1 to about 20/1. The mole ratio of HF.Eth to BF$_3$.Eth ranges from about 5 percent to about 95 percent.

The catalyst components may be performed by mixing the catalyst components together while in the presence of a small amount of a conjugated diolefin, for example, butadiene or isoprene, because a conjugated diolefin seems to stabilize the catalyst system and allows the formation of a very active preformed catalyst.

The particular order of addition in preforming the catalysts may be varied somewhat, but it is advantageous to have (1) the conjugated diolefin present before the addition of both the organoaluminum and organonickel components, and (2) to premix the boron trifluoride etherate and hydrogen fluoride etherate before adding them to the other preformed components of the catalyst. The amount of the conjugated diolefin which can be present to form the improved preformed catalyst can be varied over a wide range, and of course, is somewhat dependent on the other catalyst concentrations.

The concentration of the catalyst employed depends on factors such as purity, rate of polymerization desired, temperature and other factors. Therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in an inert solvent, and are, thus, solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, or cycloaliphatic hydrocarbons, examples of which are pentane, hexane, toluene, benzene, cyclohexane and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, e.g., butane or pentane, in which the polymer formed is relatively much less soluble. It should be understood, however, that it is not intended to exclude bulk polymerizations from the scope of this application.

It is usually desirable to conduct the polymerizations of this invention employing air-free and moisture-free techniques.

The temperatures employed in the polymerizations of this invention are not critical and may vary from a very low temperature such as −10° C. or below up to high temperatures such as 100° C. or higher. However, it is usually more desirable to employ a more convenient temperature between about 30° C. and about 90° C., and particularly from about 50° C. to 65° C.

Figure 1:
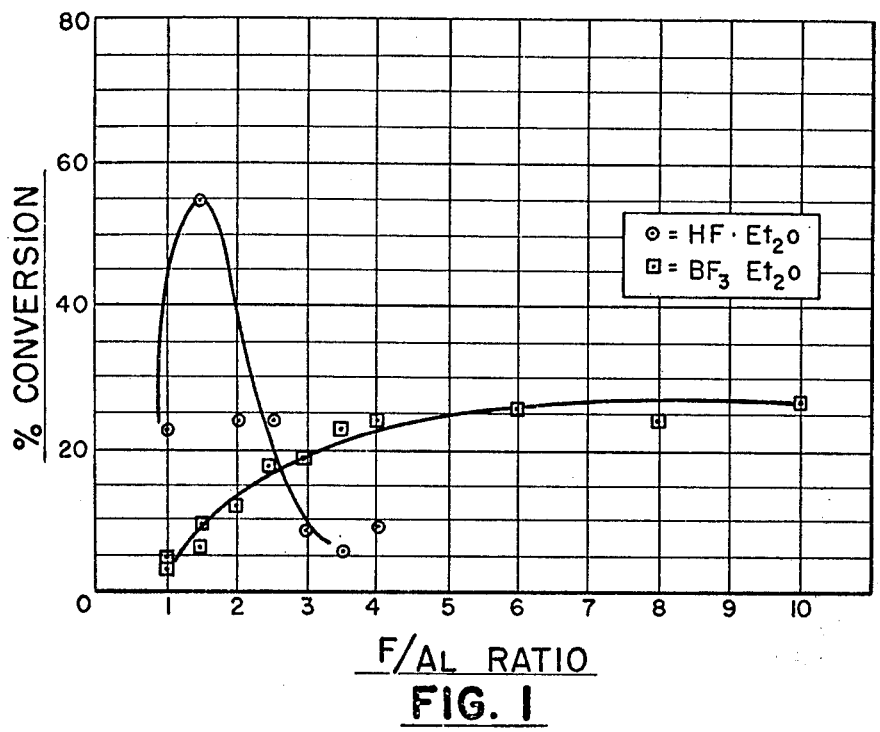
FIG. 1 illustrates rates of conversion for hydrogen fluoride diethyletherate (HF.Et$_2$O) and boron trifluoride diethyl etherate (BF$_3$.Et$_2$O) catalyst systems using triisobutyl aluminum (TIBAL) in hexane. The data indicate that the HF or BF$_3$ system above would not give polymerization rates greater than 50 percent per hour at F/Al ratios greater than 3.
Figure 2:
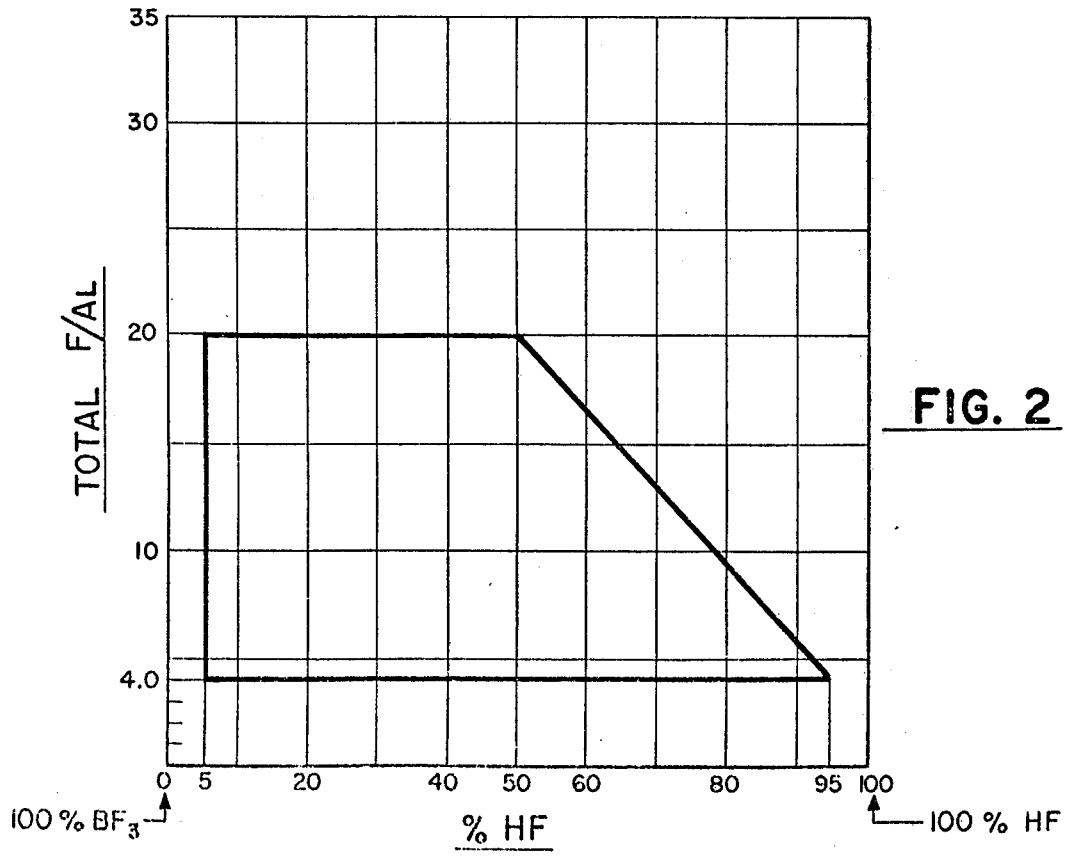
FIG. 2 illustrates the relationship between the total F/Al and the percent HF in the mixed system which describes the unobviousness of the high rate of polymerization and controlled the DSV which could not be predicted from FIG. 1.

The practice of this invention is further illustrated by reference to the following examples which are intended to be representative rather than restrictive of the scope of this invention. Unless otherwise noted, all parts and percentages are by weight. Dilute solution viscosities (DSV) have been determined in toluene at 30° C.

EXAMPLE I

A purified butadiene (Bd) in benzene solution containing 10 grams (gms) of butadiene per hundred milliliters (mls) of solution in bottles was charged with catalysts in the amounts shown in Table 1. The catalyst components and the order of their addition was (1) 0.4 mls. of a 0.25 molar triisobutyl aluminum (TIBAL) solution in hexane, (2) 0.1 mls. of a 0.05 molar nickel octanoate (NiOct) solution in hexane, (3) 0.35 mls. of an 0.25 molar hydrogen fluoride diethyl ether complex (HF.Et$_2$O) solution in hexane, and (4) 0.42 mls. of an 0.25 molar boron trifluoride diethyl ether complex (BF$_3$.Et$_2$O) solution in hexane. The sealed bottles were tumbled end over end for varying amounts of time in a water bath maintained at 50° C. The polymerizations were deactivated by the addition to the system of an amine type shortstopping agent and an antioxidant, both components being added as one part per hundred parts of the original monomer charged.

Column 1 is the experiment number; column 2 is the amount of TIBAL used; column 3 is the amount of NiOct used; column 4 is the amount of HF.Et$_2$O used; column 5 is the amount of BF$_3$.Et$_2$O used; column 6 is the yield in weight percent and column 7 is the dilute solution viscosity (DSV).

Table 1

| Exp. No. | Millimoles/100 g. Bd | | | | Weight % Yield | DSV |
|---|---|---|---|---|---|---|
| | TIBAL | NiOct | HF.Et$_2$O | BF$_3$.Et$_2$O | | |
| 1 | 1.0 | 0.05 | 0.875 | 1.05 | 61.8 | 1.88 |
| 2 | 1.0 | 0.05 | 1.75 | .75 | 81.9 | 2.24 |
| 3 | 1.0 | 0.05 | .50 | 1.175 | 52.0 | 1.59 |

All the catalysts in the above table have a constant total fluorine/aluminum ratio of about 4/1.

The above example illustrates how the mixed catalyst system gives a good polymerization rate as well as a controllable DSV.

EXAMPLE II

This example illustrates that a solvent change from benzene to hexane results in good polymerization rates along with controllable DSV while maintaining a F/Al ratio of about 4/1.

Butadiene was polymerized in a procedure similar to that of Example I except that hexane rather than benzene was used as the solvent. The results are shown in Table 2. The polymerization was conducted at 50° C. for one hour.

Table 2

| Exp. No. | Millimoles/100 g. Bd | | | | Yield % | DSV |
|---|---|---|---|---|---|---|
| | TIBAL | NiOct | HF.Et$_2$O | BF$_3$.Et$_2$O | | |
| 1 | 1.0 | 0.05 | 0.875 | 1.05 | 55.0 | 3.23 |
| 2 | 1.0 | 0.05 | 1.75 | .75 | 71.4 | 2.75 |

Table 2-continued

| Exp. No. | Millimoles/100 g. Bd | | | | Yield % | DSV |
|---|---|---|---|---|---|---|
| | TIBAL | NiOct | HF.Et$_2$O | BF$_3$.Et$_2$O | | |
| 3 | 1.0 | 0.05 | .50 | 1.175 | 50.4 | 2.72 |

EXAMPLE III

Butadiene was polymerized in a procedure similar to the procedure used in Example I, but using a catalyst consisting of (1) triisobutylaluminum (2) nickel octanoate and (3) either hydrogen fluoride diethyl ether complex or boron trifluoride diethyl ether complex. The results are shown in Table 3.

The polymerizations were run at 50° C. for two hours. These data illustrate that the HF complex or BF$_3$ complex alone does not produce the desired rate and physicals as does the mixed HF/BF$_3$ catalyst.

Table 3

| Exp. No. | Millimoles/100 g. BD | | | | Yield % | DSV |
|---|---|---|---|---|---|---|
| | TIBAL | NiOct | HF.Et$_2$O | BF$_3$.Et$_2$O | | |
| 1 | 1.0 | 0.05 | 4.0 | — | 23.2 | 3.89 |
| 2 | 1.0 | 0.05 | — | 1.325 | 42.1 | 0.02 |

The catalysts in Example III have about the same constant total fluorine to aluminum ratio as in Example I, but the DSV and the yield in Table 3 do not have the characteristics which are exemplified by the present invention. Even though the total fluoride to aluminum ratio might be the same, the inventive concept which gives the desired physical and chemical characteristics of the polymer are not a result of just fluoride to aluminum ratio and it is necessary to have the mixed fluoride compounds at an unobvious level.

EXAMPLE IV

Butadiene was polymerized in a manner similar to that of Example III using the same catalyst components and procedures, except that hexane rather than benzene was used as the organic solvent. The results are shown in Table 4. Polymerization was run at 50° C. for 1 hour.

Table 4

| Exp. No. | Millimoles/100 g. Bd | | | | Yield % | DSV |
|---|---|---|---|---|---|---|
| | TIBAL | NiOct | HF.Et$_2$O | BF$_3$.Et$_2$O | | |
| 1 | 1.0 | 0.05 | 4.0 | — | 9.8 | — |
| 2 | 1.0 | 0.05 | — | 1.325 | 23.6 | 2.00 |

Catalysts in Example IV have about the same constant total fluorine to aluminum ratio as in Example II. It is again exemplified that the total fluoride to aluminum ratio has to be a contribution of he mixed HF and BF$_3$ catalyst systems and that the unobvious nature of this invention is again exemplified by comparing the results in these two examples II and IV.

EXAMPLE V

Butadiene was polymerized using a procedure similar to that in Example I except for the following:

1. the amount of HF diethyl ether complex was kept constant and the amount of boron trifluoride diethyl ether complex was varied;
2. the polymerizations were run with benzene and hexane solvents at 50° C.

Table 5

| Exp. No. | Millimoles/100 g. Bd | | | | Yield % | DSV |
|---|---|---|---|---|---|---|
| | TIBAL | NiOct | HF.Et$_2$O | BF$_3$.Et$_2$O | | |
| 1[a] | 1.0 | 0.05 | 3.0 | 0.375 | 80.3 | 2.59 |
| 2[a] | 1.0 | 0.05 | 3.0 | 0.5 | 79.6 | 2.56 |
| 3[a] | 1.0 | 0.05 | 3.0 | 0.75 | 73.3 | 2.48 |
| 4[b] | 1.0 | 0.05 | 3.0 | 0.375 | 82.6 | 2.91 |
| 5[b] | 1.0 | 0.05 | 3.0 | 0.5 | 85.1 | 2.48 |
| 6[b] | 1.0 | 0.05 | 3.0 | 0.75 | 85.3 | 2.66 |

[a]-benzene solvent for 2 hours polymerization.
[b]-hexane solvent for 1.5 hours polymerization.

EXAMPLE VI

Butadiene was polymerized using a procedure similar to the procedure used in Example II except that the di-n-butyl ether (nBu$_2$O) complexes of hydrogen fluoride and boron trifluoride were used in place of the diethyl ether complexes. Results are shown in Table 6. Polymerizations were run in hexane at 50° C. for 1 hour.

Table 6

| Exp. No. | Millimoles/100 g. Bd | | | | Yield % | DSV |
|---|---|---|---|---|---|---|
| | TIBAL | NiOct | HF.Bu$_2$O | BF$_3$.Bu$_2$O | | |
| 1 | 1.0 | 0.05 | 1.75 | .75 | 83.1 | 3.75 |
| 2 | 1.0 | 0.05 | 0.875 | 1.05 | 66.8 | 3.28 |
| 3 | 1.0 | 0.05 | 0.50 | 1.175 | 66.4 | 2.99 |
| 4 | 1.0 | 0.05 | 4.0 | — | 19.8 | 4.51 |
| 5 | 1.0 | 0.05 | — | 1.325 | 25.5 | — |

Experiment numbers 4 and 5 refer to procedures followed in Example IV and show the poor results obtained with only one fluoride containing catalyst component.

EXAMPLE VII

Butadiene was polymerized in a manner similar to that used in Example II except that a different aluminum to nickel ratio and total quantity of catalyst components were employed. Table 7 shows the catalyst concentrations used. Polymerizations were run in hexane at 50° C. for 1.5 hours.

Table 7

| Exp. No. | Millimoles/100 g. Bd | | | | Yield % | DSV |
|---|---|---|---|---|---|---|
| | TIBAL | NiOct | HF.Et$_2$O | BF$_3$.Et$_2$O | | |
| 1 | 1.0 | 0.05 | 2.0 | 0.75 | 81.6 | 3.43 |
| 2 | 1.0 | 0.05 | 3.0 | 0.75 | 85.3 | 2.66 |
| 3 | 2.0 | 0.05 | 4.0 | 0.75 | 87.8 | 3.47 |
| 4 | 0.5 | 0.05 | 1.0 | 0.75 | 76.0 | 2.51 |
| 5 | 0.5 | 0.05 | 1.5 | 0.75 | 67.1 | 2.07 |
| 6 | 0.5 | 0.05 | 1.0 | — | 3.0 | — |
| 7 | 0.5 | 0.05 | — | 0.75 | 7.0 | — |

Data for experiment numbers 6 and 7 show the affect of using the hydrogen fluoride diethyl ether complex or boron trifluoride diethyl ether complex individually.

EXAMPLE VIII

Butadiene was polymerized in a manner similar to that used in Example I but using preformed catalysts. By "preformed" addition is meant that all the catalyst components are mixed together and then charged as a separate active catalyst system to the main polymerization system. Results are given in Table 8. Polymerizations were run in benzene at 50° C. for 1 hour.

Table 8

| Exp. No. | Millimoles/100 g. Bd | | | | | Yield | DSV |
|---|---|---|---|---|---|---|---|
| | Bd | TIBAL | NiOct | HF.Et$_2$O | BF$_3$.Et$_2$O | | |
| 1 | 15 | 1.0 | 0.05 | 3.0 | 0.375 | 53.2 | 2.46 |

Table 8-continued

| Exp. No. | Millimoles/100 g. Bd | | | | | Yield | DSV |
|---|---|---|---|---|---|---|---|
| | Bd | TIBAL | NiOct | HF.Et$_2$O | BF$_3$.Et$_2$O | | |
| 2 | 21 | 1.4 | 0.07 | 4.2 | 0.525 | 68.3 | 2.39 |

The catalyst components and their order of addition were (1) solvent, (2) butadiene, (3) triisobutylaluminum, (4) nickel octanoate and (5) the premixed hydrogen fluoride diethyl ether and boron trifluoride diethyl ether complexes. These complexes must be premixed before addition to the other catalyst components. The sealed preformed catalyst bottles are then tumbled in a 50° C. water bath for 0.5 hours before charging to the main polymerization system.

EXAMPLE IX

Butadiene was polymerized in a manner similar to that of Example I except that tri-n-butylaluminum (TNBA) was used as the organoaluminum component. Polymerization times were 1 hour. The results are shown in Table 9.

Table 9

| Exp. No. | Millimoles/100 g. Bd | | | | Weight % Yield | DSV |
|---|---|---|---|---|---|---|
| | TNBA | Ni salt | HF.Et$_2$O | BF$_3$.Et$_2$O | | |
| 1 | 1.0 | 0.05 | 0.875 | 1.05 | 56.5 | 3.02 |
| 2 | 1.0 | 0.05 | 1.750 | 0.75 | 56.7 | 3.62 |
| 3 | 1.0 | 0.05 | 0.5 | 1.175 | 50.9 | 2.71 |
| 4 | 1.0 | 0.05 | 4.0 | — | 27.8 | 6.23 |
| 5 | 1.0 | 0.05 | — | 1.325 | 41.9 | 2.29 |

Therefore, the main embodiment of this invention is a process for the polymerization of butadiene under solution polymerization conditions to form polybutadiene having a high proportion of butadiene units in the cis-1,4 configuration comprising contacting butadiene with a catalyst consisting essentially of (1) an organoaluminum compound (Al) selected from the group consisting of triisobutylaluminum and tri-n-butylaluminum, (2) an organonickel compound (Ni), and (3) a fluorinated mixture wherein the improvement comprises utilizing a mixture of hydrogen fluoride etherate (HF.Eth) and boron trifluoride etherate (BF$_3$.Eth) and boron trifluoride etherate (BF$_3$.Eth) where the molar ratio of fluoride to aluminum (F/Al) (total fluoride from BF$_3$.Eth and HF.Eth) ranges upward from 3.0/1 to 20/1 when the mole percent of HF with respect to the total fluoride ranges from about 5 percent to 50 percent and when the mole percent of HF with respect to the total fluoride ranges from 50.1 percent to 95 percent, then for every one percent increase of HF in said hydrogen fluoride etherate and boron trifluoride etherate mixture, the F/Al molar ratio starting at 20/1, has to decrease by 0.377.

While certain representative embodiments and details have been shown for the purpose of illustrating the invention, it will be apparent to those skilled in this art that various changes and modifications may be made therein without departing from the spirit or scope of the invention.

What is claimed is:

1. In a process for the polymerization of butadiene under solution polymerization conditions to form polybutadiene having a high proportion of butadiene units in the cis-1,4-configuration comprising contacting butadiene with a catalyst consisting essentially of (1) an organoaluminum compound (Al) selected from the group consisting of triisobutylaluminum and tri-n-butylaluminum, (2) an organonickel compound (Ni), and (3) a fluorinated mixture wherein the improvement comprises utilizing a mixture of hydrogen fluoride etherate (HF.Eth) and boron trifluoride etherate (BF$_3$.Eth) and boron trifluoride etherate (BF$_3$.Eth) where the molar ratio of fluoride to aluminum (F/Al) (total fluoride from BF$_3$.Eth and HF.Eth) ranges upward from 3.0/1 to 20/1 when the mole percent of HF with respect to the total fluoride ranges from about 5 percent to 50 percent and when the mole percent of HF with respect to the total fluoride ranges from 50.1 percent to 95 percent, then for every one percent increase of HF in said hydrogen fluoride etherate and boron trifluoride etherate mixture, the F/Al molar ratio starting at 20/1, is decreased by 0.377.

2. A process according to claim 1 wherein the mole ratio of the organoaluminum compound (Al) to the organonickel compound (Ni) ranges from about 10/1 to about 60/1.

3. A process according to claim 1 wherein the ether compound is selected from the group consisting of diethylether, di-n-propylether, diisopropylether, di-n-butylether and diisobutylether.

4. A process according to claim 1 wherein the organonickel compound is selected from the group consisting of nickel benzoate, nickel acetate, nickel naphthenate, nickel octanoate, bis($\alpha$-furyl dioxime) nickel, nickel palmitate, nickel stearate, nickel acetylacetonate, nickel salicaldehyde, bis(cyclopentadiene) nickel, bis(salicylaldehyde) ethylenediimine nickel, cyclopentadienylnickel nitrosyl and nickel tetracarbonyl.

5. A catalyst composition consisting essentially of (1) an organoaluminum compound (Al) selected from the group consisting of triisobutylaluminum and tri-n-butylaluminum, (2) an organonickel compound (Ni) and (3) a fluorinated mixture wherein the improvement comprises utilizing a mixture of hydrogen fluoride etherate and boron trifluoride etherate where the mole ratio of fluoride/aluminum (F/Al) ranges upwardly from 3.0/1 to 20/1 when the mole percent of HF with respect to the total fluoride ranges from about 5 percent to 50 percent and when the mole percent of HF with respect to the total fluoride ranges from 50.1 percent to 95 percent, then for every one percent increase of HF in said hydrogen fluoride etherate and boron trifluoride etherate mixture, the F/Al molar ratio starting at 20/1 is decreased by 0.377.

6. A composition according to claim 5 wherein the mole ratio of the organoaluminum compound (Al) to the organonickel compound (Ni) ranges from about 10/1 to about 60/1.

7. A composition according to claim 5 wherein the ether compound is selected from the group consisting of diethyl ether and di-n-butyl ether.

8. A composition according to claim 5 wherein the organonickel compound is selected from the group consisting of nickel benzoate, nickel acetate, nickel naphthenate, nickel octanoate, bis($\alpha$-furyl dioxime) nickel, nickel palmitate, nickel stearate, nickel acetylacetonate, nickel salicaldehyde, bis(cyclopentadiene) nickel, bis(salicylaldehyde) ethylenediimine nickel, cyclopentadienyl-nickel nitrosyl and nickel tetracarbonyl.

* * * * *